April 28, 1931.   R. L. HINMAN   1,803,253
MILKING MACHINE
Filed Jan. 17, 1930   2 Sheets-Sheet 2
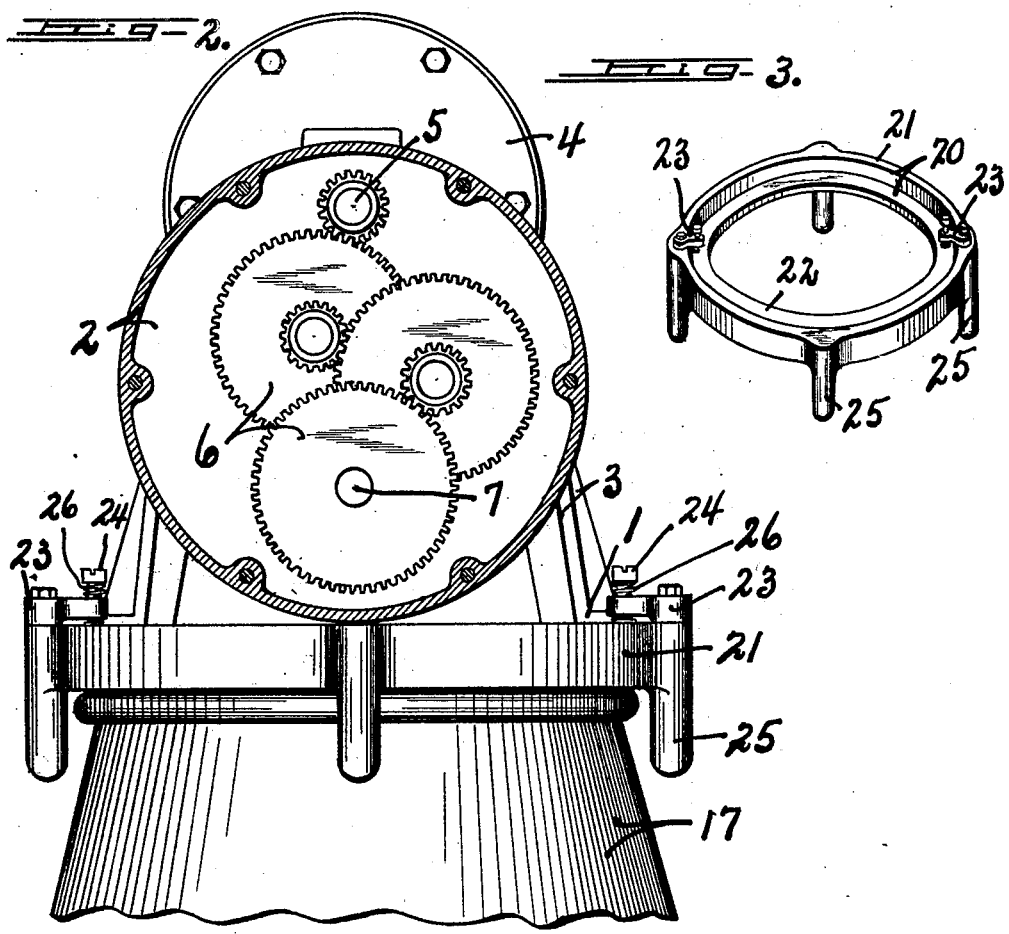
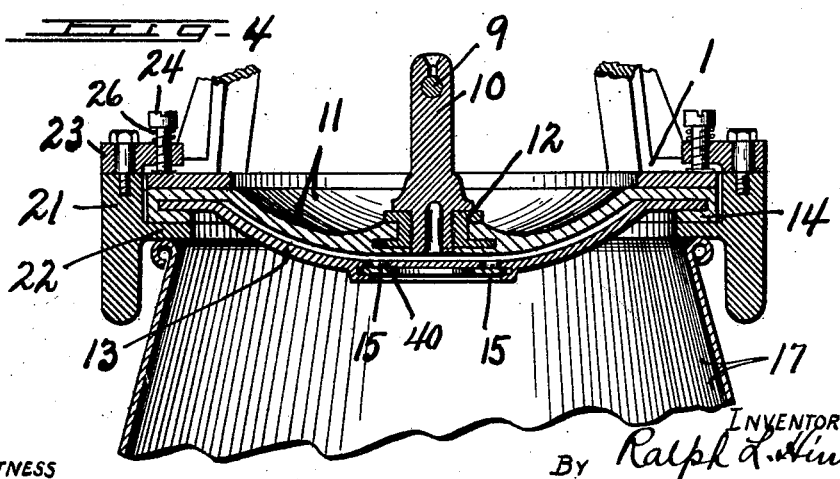
WITNESS
H. L. Meade.
INVENTOR
Ralph L. Hinman
BY
Denison Thompson
ATTORNEYS Patented Apr. 28, 1931

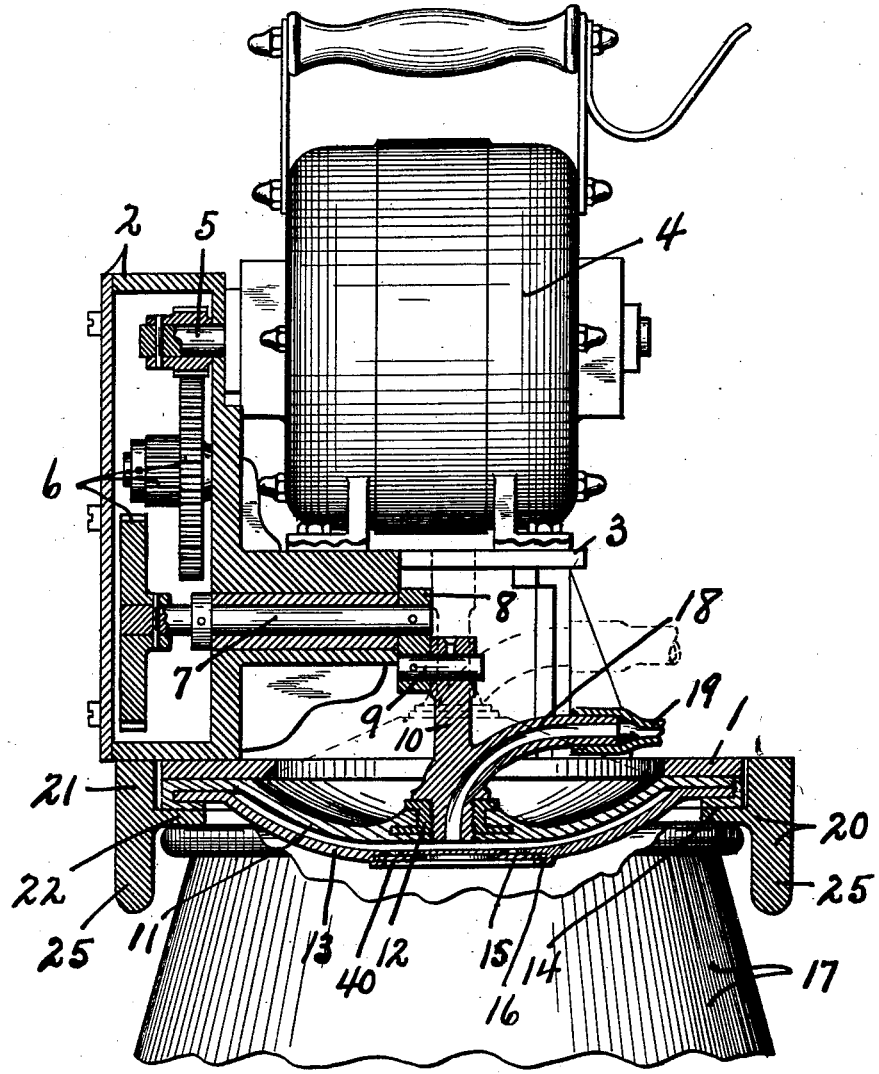

1,803,253

UNITED STATES PATENT OFFICE

RALPH L. HINMAN, OF ONEIDA, NEW YORK, ASSIGNOR TO HINMAN MILKING MACHINE COMPANY INCORPORATED, OF ONEIDA, NEW YORK, A CORPORATION OF NEW YORK

MILKING MACHINE

Application filed January 17, 1930. Serial No. 421,486.

This invention relates to certain new and useful improvements in milking machines, and is a further improvement upon the structure described and claimed in my copending application, Serial No. 309,233, filed September 29th, 1928.

The main object of the present invention is to provide a structure including a milk bowl and a diaphragm for producing suction and pressure in the bowl, in which the diaphragm edge is so firmly clamped to the bowl as to eliminate the possibility of air leaking into the bowl through this joint.

Further, it is found that when the reversely bent flexible edge of the diaphragm is permitted to rest upon the upper edge of a milk pail, an air-tight joint is apt to result and the discharge of milk from the bowl under pressure into the pail tends to build up a pressure in the pail above atmosphere and such pressure in the pail opposes the discharge of milk from the bowl and also acts to reduce the average vacuum produced in the teat cups and the line leading thereto, and a further object of this invention is to provide a structure which assures the existence of atmospheric pressure in the milk pail.

Other objects and advantages relate to the details of the structure and the form and relation of the parts thereof, all as will more fully appear from the following description taken in connection with the accompanying drawings in which:—

Figure 1 is an elevation of an apparatus of this invention partially in section.

Figure 2 is a similar view taken at right angles to Figure 1.

Figure 3 is a perspective view of the removable base.

Figure 4 illustrates, in section, the assemblage of the main frame diaphragm milk bowl and base.

As illustrated in the drawings, the structure comprises a main frame —1— carrying a gear housing —2— and a platform —3— either integrally or secured thereto in any suitable manner. A suitable motor —4— may be mounted on platform —3— with its armature shaft —5— extending into gear case and acting to drive a train of reduction gearing —6—, the last gear of which drives shaft —7— upon the end of which there is secured a crank arm —8— provided with a crank pin —9— upon which the diaphragm operating rod —10— is journaled. The diaphragm —11— may be provided at its central portion with an opening in which is mounted a threaded bushing or tube —12— illustrated as partially imbedded in the rubber material of the diaphragm and the lower end of the diaphragm operating rod —10— is threaded into this tube or bushing —12— to secure the parts together.

The diaphragm —11— may be formed of a comparatively thick rubber disk of somewhat greater diameter than the concave or spherically concave milk bowl —13— and the outer edge of the diaphragm is reversely folded about the outer edge of the bowl —13— to provide a comparatively firm connection between the diaphragm and the bowl, the edge —14— of the diaphragm extending inwardly along the undersurface of the edge of the bowl a considerable distance. The bowl —13— is provided with a plurality of preferably concentrically arranged openings —15— in its bottom wall, and a valve —40— is provided of flexible material, such as rubber, and of annular form, and so positioned as to normally close all the openings —15— and this valve may be supported in an annular recess —16— formed on the bottom of the bowl.

When pressure is produced in the milk chamber between the diaphragm and the bowl, the inner edge of the flexible valve —15— will be forced downwardly to permit milk to flow through openings —15— into the pail —17—. This structure is, in effect, substantially the same that is disclosed in my said co-pending application.

A tube —18— penetrates the diaphragm rod —10— axially thereof and opens into the milk chamber, and this tube may be connected as by flexible tubing —19— to a series of teat cups.

The diaphragm and milk bowl may be assembled in position against the underside of the annular frame —1— so that the central portion of the diaphragm is free to move inwardly and outwardly through the central opening in the frame —1—. With the parts in this position, the base member —20— is assembled in the position shown in the various figures. This base member —20— consists of a vertical annulus —21— of a diameter slightly greater than that of the frame 1—1 or the exterior of diaphragm —11— and which annulus is adapted to surround the edge of frame —1—, diaphragm —11— and milk bowl —13—. This annulus is provided with a horizontal inwardly extending annular flange —22— upon which the reversely bent edge of diaphragm —11— rests.

The frame —1— and base 21— are removably secured together in any suitable manner to clamp the diaphragm and milk bowl firmly in place and form an air-tight joint between them as, for instance, by means of the swinging clips —23— pivoted to the upper edge of the annulus —21— and swingable over the upper surface of the main frame —1— and these clips at their ends carry adjustable screws —24— threaded through the ends of the clips and adapted to abut at their lower ends against the upper surface of the main frame —1—. By threading these adjusting screws more or less through the clips, the tightness of the clamping together of the parts may be regulated.

Springs —26— may be provided between the heads of the screws —24— and the respective clips —23—.

The base member —20— may further be provided with any suitable number of legs —25— for supporting the milking machine independently of the pail —17—.

It will be apparent that with this structure, the annular flange —22— is adapted to rest upon the upper edge of the milk pail —17—, and as metallic surfaces which are not formed for contact with great accuracy cannot produce an air-tight joint, this feature of the present construction acts to maintain atmospheric pressure in the pail —17— by permitting the escape of air between the flange —22— and the top of the pail, and as no added pressure exists in the pail, it cannot react upon the milk chamber to vary the average effective vacuum utilized for milking.

Further, the flange —22— acts to protect the returned bent portion —14— of the diaphragm and in conjunction with the frame member —1—, holds the diaphragm in air-tight relation with the edge of the milk bowl —13—.

Although I have shown and described a specific structure, together with details of form and relation of the parts thereof as constituting a perhaps at present preferred form of the invention, I do not desire to restrict myself to the details of form, construction or arrangement, as various changes and modifications may be made within the scope of the appended claims.

I claim:

1. In a milking machine having a diaphragm pump, the combination with an annular frame member, and a milk bowl, of a flexible diaphragm having a portion positioned between the frame member and the bowl and its edge portion reversely folded about the edge of the milk bowl and a base member having a flange engaging the reversely folded part of the diaphragm below the milk bowl and adapted to seat upon a milk receptacle, and means for removably clamping the base member to the frame.

2. In a milking machine having a diaphragm pump, the combination with an annular frame member, and a milk bowl, of a flexible diaphragm having a portion positioned between the frame member and the bowl and its edge portion reversely folded about the edge of the milk bowl and a base member having a flange engaging the reversely folded part of the diaphragm below the milk bowl and adapted to seat upon a milk receptacle, means for removably clamping the base member to the frame, and legs depending from the base member at the outer edge of the flange for supporting the apparatus independently of a milk receptacle.

In witness whereof I have hereunto set my hand this 9th day of January, 1930.

RALPH L. HINMAN.